(12) United States Patent
Elliot et al.

(10) Patent No.: US 8,520,266 B2
(45) Date of Patent: Aug. 27, 2013

(54) METHOD AND APPARATUS FOR MEASURING IMAGE ON PAPER REGISTRATION

(75) Inventors: Jack Gaynor Elliot, Penfield, NY (US); Rakesh Suresh Kulkarni, Webster, NY (US); Martin Edward Hoover, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 816 days.

(21) Appl. No.: 12/625,252

(22) Filed: Nov. 24, 2009

(65) Prior Publication Data

US 2011/0122455 A1    May 26, 2011

(51) Int. Cl.
*H04N 1/00*    (2006.01)
(52) U.S. Cl.
USPC ............. 358/406; 358/1.9; 358/448; 358/474
(58) Field of Classification Search
USPC ....................................................... 358/406
See application file for complete search history.

(56) References Cited

U.S. PATENT DOCUMENTS

| | | | |
|---|---|---|---|
| 5,130,525 | A | 7/1992 | Ryon |
| 6,470,099 | B1 * | 10/2002 | Dowdy et al. ................. 382/287 |
| 7,106,477 | B2 | 9/2006 | Horobin |
| 2004/0196325 | A1 * | 10/2004 | Castano et al. ................. 347/19 |
| 2005/0185227 | A1 * | 8/2005 | Thompson .................... 358/474 |

* cited by examiner

*Primary Examiner* — Benny Q Tieu
*Assistant Examiner* — Marcellus Augustin

(57) ABSTRACT

A method and apparatus for measuring image on paper registration including placing a test sheet of media including a plurality of test pattern marks on a platen of an image sensing device. The platen defines a scan area over which the image sensing device is capable of scanning an image. The image sensing device includes a plurality of calibration marks falling within the scan area. The method further includes operating the scanner to scan the test sheet; determining a scanned position of the calibration marks and a scanned position of the test marks resulting from the scan; comparing the scanned position of the calibration marks with reference position of the calibration marks to determine scanning error; determining an adjusted position of the test marks responsive to the scanning error; and comparing the adjusted test mark positions with predetermined reference positions to measure registration accuracy. An edge guide disposed on the platen assists in aligning the test sheet for scanning.

9 Claims, 6 Drawing Sheets

METHOD AND APPARATUS FOR MEASURING IMAGE ON PAPER REGISTRATION

TECHNICAL FIELD

Embodiments disclosed herein relate to printing systems and, more particularly, to systems and techniques for evaluating the registration of images by image transfer systems.

BACKGROUND

In various reproduction systems, including xerographic printing, the control and registration of the position of imageable surfaces such as photoreceptor belts, intermediate transfer belts, if any, and/or images on such imageable surfaces, and the control and registration of images transferred to and developed on a medium, such as for example, a sheet of paper, involve both initial and process control methods. Image on paper errors can show up as absolute position errors, magnification or shrinkage errors and image skew errors. Position errors may be caused by the paper alignment devices. Magnification and shrinkage errors may be caused due to shrinkage of paper in the fuser and errors in photoreceptors or Roster Output Scanner (ROS) polygon speeds. Skew errors are caused by ROS skew and errors in image alignment devices.

Current procedures for measuring or evaluating image on paper registration (IOP) on printing machines are extremely tedious, iterative and cumbersome. They involve printing internal test prints and manual measurement of different artifacts on each side of the paper with a flexible scale and inputting those values to the printer. This is done in a serial fashion, one factor at a time, resulting in a long setup time, setup errors and customer dissatisfaction.

One technique for measuring image to paper registration involves scanning the printed medium on a flatbed scanner. The image on the printed medium may then be compared to an ideal image and deviation from ideal may be determined. The measurements used, however, are limited to sheets smaller than the full capacity of a printer primarily due to the size of the scanner and the method of analysis. In addition, the precision of measurements tend to be limited by the accuracy of the scanner itself. In order to eliminate errors caused by the scanning process, a separate time consuming procedure is required for calibration of the scanner. Furthermore, some techniques tend to use only a few (3-4) points on the page for measurement, thus limiting the information that is gathered. As such, there is no opportunity to use averaging to help interpret spatial errors, nor is there enough information to understand the signature of the errors.

Furthermore, it is tedious and time consuming for a user to properly place the sheet on the platen. Image on paper registration measurement requires edge detection and, therefore, overscanning of the edges, which means that the user must create a gap between the edges of the sheet and the edges of the scan area. This is especially tedious when handling a large number of sample prints. An operator can easily fail to create a gap because the scan area is generally unmarked.

Accordingly, it would be desirable to provide a system for accurately measuring image on paper registration.

SUMMARY

According to aspects described herein, there is disclosed a method of measuring image on paper registration including placing a test sheet of media including a plurality of test pattern marks on a platen of an image sensing device. The platen defines a scan area over which the image sensing device is capable of scanning an image. The image sensing device includes a plurality of calibration marks falling within the scan area. The method further includes operating the scanner to scan the test sheet; determining a scanned position of the calibration marks and a scanned position of the test marks resulting from the scan; comparing the scanned position of the calibration marks with corresponding calibration mark reference positions to determine scanning error; determining an adjusted position of the test marks responsive to the scanning error; and comparing the adjusted test mark positions with predetermined reference positions to measure registration accuracy.

According to other aspects described herein, there is provided a method of biasing a sheet for image on paper registration measurement including placing an edge guide on an image sensing device having a platen for supporting a test sheet for scanning. The test sheet includes a plurality of test marks thereon. At least a portion of the platen defines a scan area over which the image sensing device is capable of scanning an image wherein at least a portion of the edge guide extends onto the scan area. The method further includes placing the sheet on the platen wherein an edge of the sheet engages the edge guide and the edge lies within the scan area; scanning the sheet; and detecting the edge of the sheet which engages the guide.

According to further aspects described herein, there is provided an image on paper registration measuring device including a scanner having a platen for supporting a sheet having a one or more test pattern marks thereon, at least a portion of the platen defines a scan area. A plurality of calibration marks is disposed within the scan area and being detectable during operation of the image sensing device. An image processor identifies the calibration marks and the marks on the sheet upon scanning of the sheet. A processor calibrates the scanner and determines the position of the test pattern marks based upon imaging from a single scan.

DETAILED DESCRIPTION

As used herein, an "image processing device", "printer," "printing assembly" or "printing system" refers to one or more devices used to generate "printouts" or a print outputting function, which refers to the reproduction of information on substrate media for any purpose. An "image processing device", "printer," "printing assembly" or "printing system" as used herein encompasses any apparatus, such as a digital copier, bookmaking machine, facsimile machine, multi-function machine, etc. which performs a print outputting function.

An "image processing device", printer, printing assembly or printing system can use an "electrostatographic process" to generate printouts, which refers to forming and using electrostatic charged patterns to record and reproduce information, a "xerographic process", which refers to the use of a resinous powder on an electrically charged plate record and reproduce information, or other suitable processes for generating printouts, such as an ink jet process, a liquid ink process, a solid ink process, and the like. Also, such a printing system can print and/or handle either monochrome or color image data.

As used herein, "sheet" or "sheet of paper" refers to, for example, paper, transparencies, parchment, film, fabric, plastic, photo-finishing papers or other coated or non-coated substrate media in the form of a web upon which information or markings can be visualized and/or reproduced. While specific reference herein is made to a sheet or paper, it should be understood that any substrate media in the form of a web amounts to a reasonable equivalent thereto.

As used herein, the term "image sensing device", "image scanning device" or "scanner" refers to one or more devices using optics, sensors, photography or other hardware and software for detecting and/or measuring the intensities of one or more images or marks on a sheet, such as for a raster input device. Such devices can include scanners, cameras or other image sensing techniques.

As used herein "test sheet of media" refers to a substrate including image imparted thereon for use in measuring the registration of a printing device.

As used herein "test pattern marks" refers to one or more images imparted on a test sheet for measuring the registration of a printing device.

As used herein "calibration marks" refers to images disposed within a scan area used to calibrate the scanner.

As used herein "scanned position of the test marks" refers the position of the test marks as determined by a scanner uncorrected for scanner error.

As used herein "an adjusted position" refers to revised positional information of a mark certain information is taken into account such as scanning error.

As used herein "edge guide" refers to a physical member providing alignment of an edge of a substrate.

Figure 1:
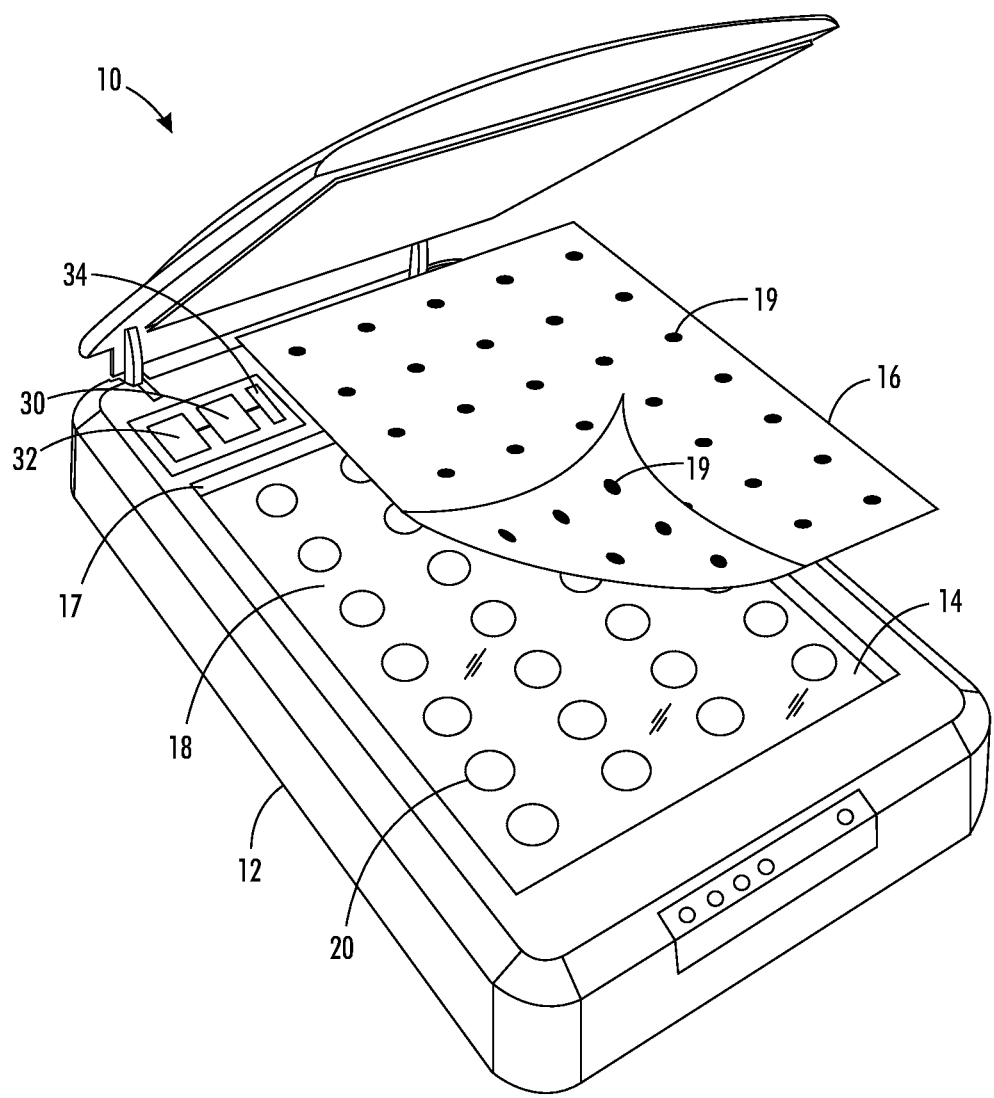
FIG. 1 is a perspective view of image on paper registration measurement system including a scanner.

With reference to FIG. 1, a system 10 for providing image on paper registration measurement is shown. The system may determine deviation of a printed image from an ideal or desired configuration. The system 10 may include an image sensing device such as a scanner 12 including a platen 14. The scanner may be of any type known in the art such as a flatbed scanner used to scan and image process sheets. A test sheet of substrate media 16 may be placed on top of the platen 14. The scanner may have a scan bar 17 including a linear array of optical sensors. The scan bar 17 is translatable below the platen 14 by a drive mechanism (not shown) to scan an image on the test sheet of substrate media 16. The scan bar's sensors may cover a predetermined portion of the platen, such scanned portion defining a scan area 18.

In order to measure the quality of the image processing device, it is desirable to determine if the images imparted on the sheet are properly positioned or registered. A test sheet 16 may be processed by the image processing device such as a digital printer or copier. The test sheet may be printed with an image such as a predetermined test pattern of markings 19. If the printed image is properly registered, the images should be located on the sheet in precisely known reference locations.

After the sheet is printed with the test pattern markings 19, the sheet 16 may then be scanned by scanner 12.

After the test sheet 16 is scanned, the positions of the test pattern marks 19 are compared with reference test pattern mark positions stored in memory using image processing software and/or hardware. The comparison determines to what extent, if any, the test pattern marks 19 deviate from the reference locations. However, the scanner 12 itself may include errors which would detrimentally affect the results of the scanned test sheet 16. Without isolating the scanner error, it becomes difficult to determine whether deviation of the test pattern marks 19 is the result of the printing process, the scanning process or both. Therefore, the present embodiments calibrate the scanner to determine such scanner errors so that the registration of the scanned test pattern can be properly measured.

In order to account for and isolate the scanner errors, the platen 14 may include calibration marks 20 formed thereon. The calibration marks 20 may be in the form of a 2-dimensional array of positional calibration marks 20 spread out over the scanning area 18. The calibration marks 20 may include a series of dots, circles, crosses, or other markings or combination of markings as desired. The calibration marks 20 may be etched or painted onto the platen 14 such that they are positionally fixed thereto and become an intrinsic part of the scan area 18. The platen 14 may be formed of a dimensionally stable material such as a glass plate; therefore, the calibration marks 20 formed thereon maintain their position. Accordingly, when the scan bar 17 is moved across the scan area 18, the calibration marks 20 will always be located in the same location within the scan area 18. Any deviation of these calibration marks from known calibration mark reference locations is the result of scanner deviation or error.

When a test sheet 16 is placed on the platen 14 and the scanner is activated, both the calibration marks 20 and test sheet 16 are scanned at the same time. The position of the calibration marks 20 as determined by an image processor resulting from the scan, or scan position, is compared to the corresponding calibration mark reference locations stored in memory. A scanner processor 30 calculates the deviation between the reference position of the calibration mark 20 and the scanned position for each of the calibration marks. Such deviation is caused by the scanning process. This scanner deviation can be calculated for every scan with regard to every calibration mark 20. Therefore, upon every scan, the scanner is calibrated across the entire scan area 18.

During the same scan in which the calibration marks 20 are imaged and any deviation calculated, the positions of the printed test pattern marks 19 on the test sheet 16 are also determined. During the scan, the image processor 32 identifies the test pattern marks 19 and the scanned position of each of the marks is determined. The image processor 32 may be operably connected to the scan bar 17 and the scanner processer 30. Since the location of the calibrations marks 20 is known, the position of the test pattern marks 19 may be measured relative to an adjacent calibration mark. This provides enhanced measurement accuracy over measuring all the test pattern marks relative to one fixed reference point. The scanner deviation calculated using the calibration marks 20 is subtracted by the scanner processor 30 from the scanned location of the test pattern marks. This provides corrected or adjusted test mark locations. The scanner deviation may vary over the scan area; therefore, the amount of correction needed for one test pattern mark may be different than the correction for a test pattern mark located elsewhere on the sheet. Therefore, each of the locations of the test pattern marks can be adjusted based on the deviation of the adjacent calibration mark. Thus, accurate information as to the actual location of the test pattern marks is determined free from scanner error.

With the location of the test pattern marks 19 determined substantially free from errors introduced during the scanning process, the adjusted test mark positions can be compared to corresponding reference test mark positions. Deviation between the positions of the adjusted printed test pattern marks and the corresponding reference test mark positions can be determined. Any deviation measured between the position of the corrected printed test pattern marks 19 and the reference positions would then be the result of image on paper registration errors. The registration information obtained by the scan may be used in order to adjust the printing device to correct the registration and/or to evaluate the functioning of the printing device. Accordingly, with a single scan of the media 16 scanner error can be compensated for and image on paper registration information can be obtained with a high degree of precision.

Figure 2:
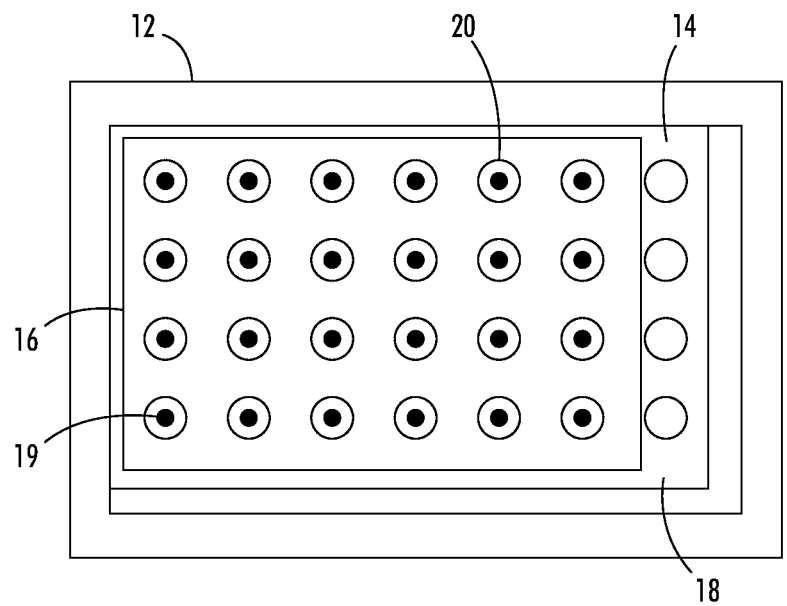
FIG. 2 is an elevational bottom view of a scanner platen covered by a test pattern sheet.
Figure 3:
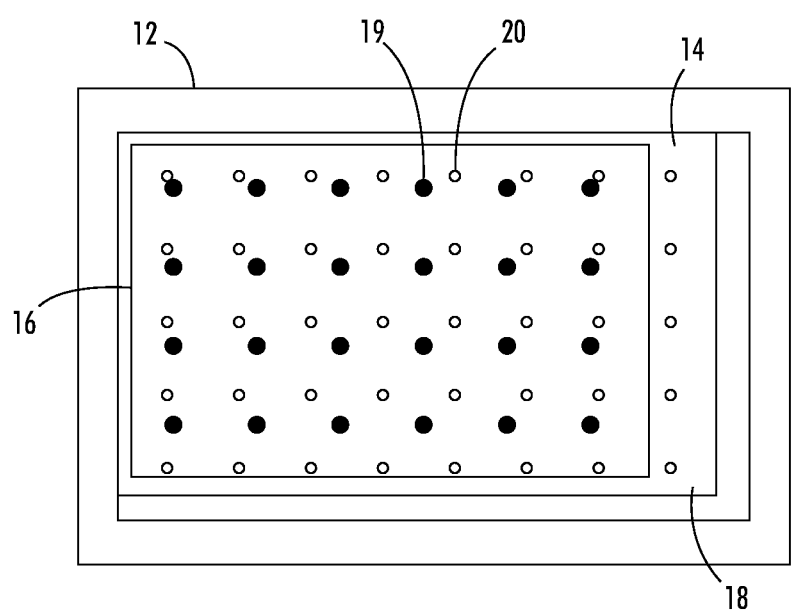
FIG. 3 is an alternative embodiment of an elevational bottom view of a scanner platen covered by a test pattern sheet

As shown in FIGS. 2 and 3, calibration marks 20 can be placed in a wide variety of patterns on the platen 14 and can be of all shapes and sizes. In order for the scanner to read both the calibration marks 20 and the test pattern marks 19 it is desirable that the two sets of marks may be arranged so that they are spaced from each other and do not overlap. Significant spacing between the two sets of marks, 19 and 20, allows for some degree of tolerance for placement of the sheet on the platen by an operator.

In order to permit the image processor to further distinguish the calibration marks 20 from the test pattern marks 19, the gray level between the two sets of marks may be varied. Additionally, if the test marks 19 and image marks 20 are spaced differently, then there is no need to avoid overlapping the marks. If one type of marks is found too close to another mark and they cannot be distinguished by the image processer, these marks may be removed from the calibration and registration analysis.

During a scan the deviation or errors may vary throughout the scan area 18. For example, the deviations at the edges of the scan area may be different than the deviation in the middle of the scan area. In addition, deviation in the scan direction may be different from deviation in the cross scan direction. By including a 2-dimensional array of calibration marks 20 over the scan area, the deviation from scanning can be determined over the entire scan area, not just the edges. By determining the deviation for a particular calibration mark the same deviation can be expected for an adjacent test pattern mark. By knowing the deviation at different points throughout the scan area, the position of each of the reference marks can be accurately determined.

Figure 4:
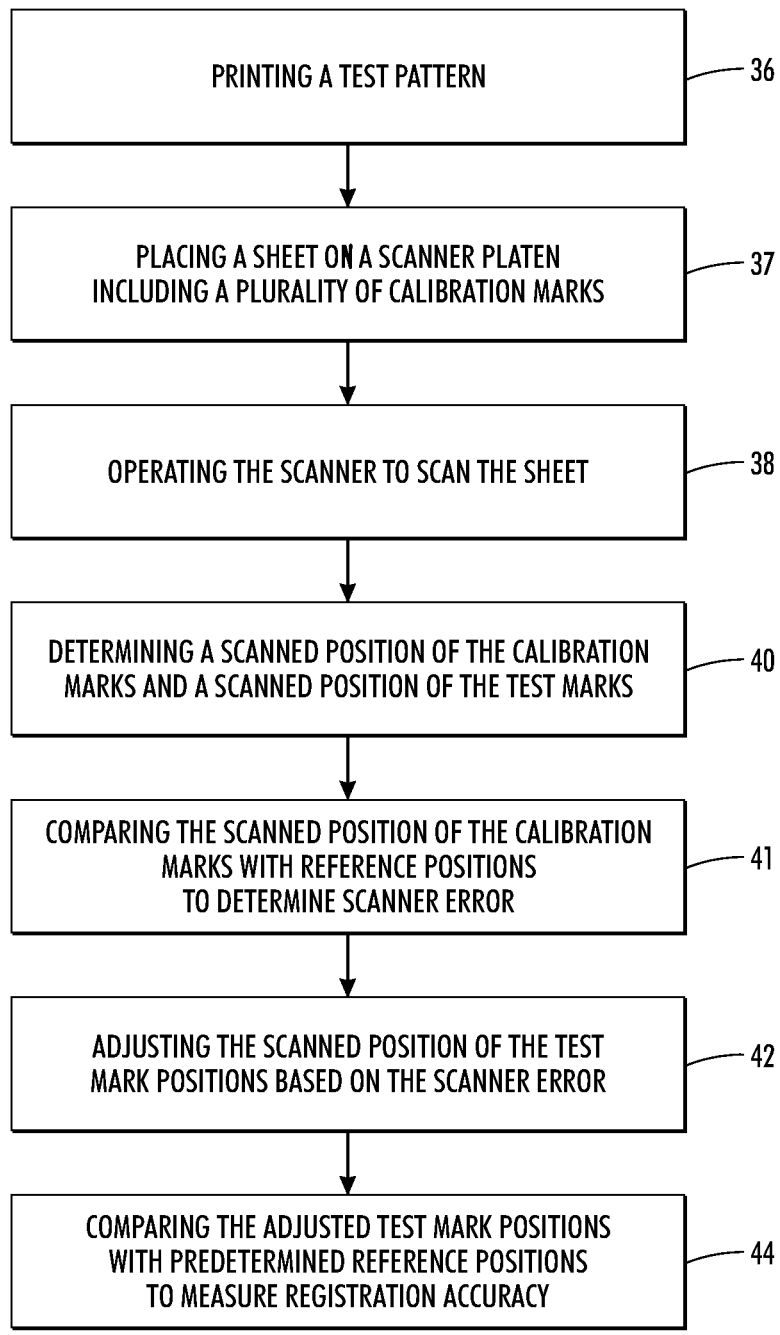
FIG. 4 is a flow diagram of a method embodiment.

In a method embodiment shown in FIG. 4, test pattern marks are printed on a sheet by a document processing device 36. The printed test sheet is then placed on the platen of the scanner which includes an array of calibration marks 37. The scanner is then operated to scan the test sheet 38. A scanned position of the calibration marks and a scanned position of the test pattern marks are determined 40. The scanned positions of the calibration marks are compared to the reference positions in order to determine scanner error 41. The scanned positions of the test pattern marks are modified in response to any determined scanner error 42. The modified test mark positions are compared to predetermined reference positions to measure registration accuracy 44.

Figure 5:
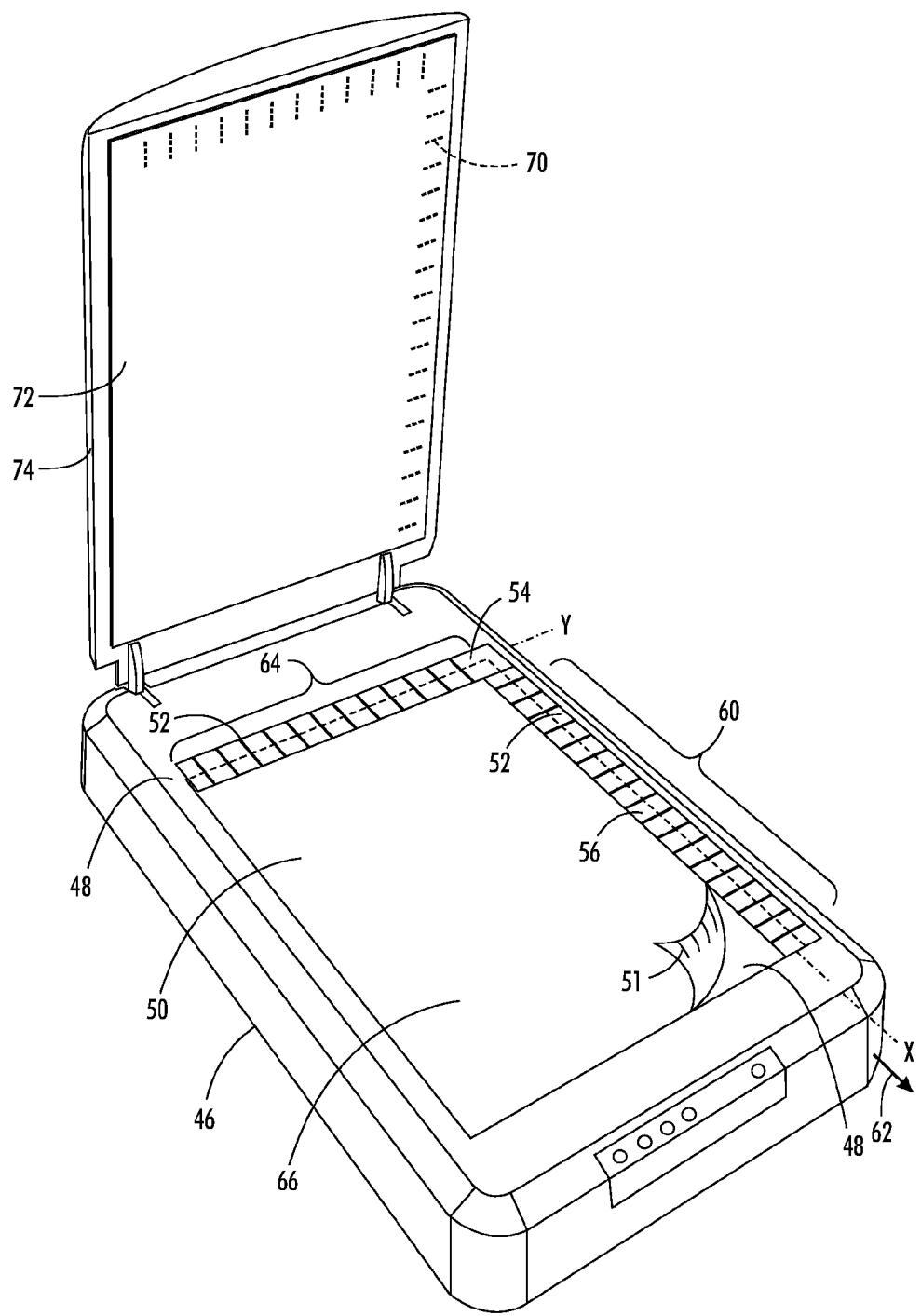
FIG. 5 is a perspective view of a scanner having calibration marks along the edges of the scanner platen.

In an alternative embodiment shown in FIG. 5, a flat bed scanner 46 may include a scanner platen 48 upon which a test sheet 50 including test pattern marks 51 is placed. Platen 48 may include calibration marks 52 spaced along the side edges 54 of the platen. The calibration marks 52 are located within the scan area 56 so that upon operation of the scanner, the markings are "viewed" by the scan bar (not shown). The calibration marks 52 may be located along one or two of the side edges. As in the previously described embodiment, the calibration markings 52 may be etched or painted onto the platen 48. Alternatively, a film formed of dimensionally stable material and including the calibration marks 52 may be applied to the platen surface and secured thereto. The calibration marks 52 may also be included on a strip of film which is applied to the platen 48. The platen 48 may be made of glass or other dimensionally stable material so that the calibration marks 52 will maintain position. The calibration marks 52 may include a series of spaced lines extending along the platen edge. It is further contemplated that the calibration marks 52 could be of various shapes and configurations.

A first set 60 of calibration marks 52 may extend in an X direction which is in the direction of scan as indicated by arrow 62. A second set 64 of calibration marks 52 may extend in the Y direction which is perpendicular to the direction of scan. When the test sheet 50 including test pattern marks 51 is placed on the platen 48 and scanned, the first and second set 60 and 64 of calibration marks are also scanned. The scanned positions of the calibration marks 52 are compared to stored reference positions. Therefore, deviation in the X and Y axis resulting from the scanning process can be determined. As in the previously described embodiment, the determined scanner error may be subtracted from the scanned image of the test pattern marks 51 and the location of the test pattern marks can be corrected. Therefore, the precise location of the test pattern marks 51 can be determined. The corrected location of the test pattern marks 51 can then be compared to the reference locations of a test pattern marks to permit the image on paper registration error to be measured. Including calibration marks along the edges which are imaged during every scan provides the ability to correct for the non-repeatable errors in the scanner from scan to scan and drift in the scanner over time of measurements.

In an alternative embodiment, as shown in FIG. 5, calibration marks 70 may be disposed on the inside surface 72 of the scanner cover 74 which overlies the platen 48. In this embodiment, the calibration marks would not be on the platen. The surface may include a black background with white markings. Therefore, when the cover 74 is closed and the scanner activated, the white markings will clearly show up. The black background will also highlight the edges of the scanned sheet, making the position of the sheet edges and corners easy to determine which aids in the image on paper registration process.

Figure 6:
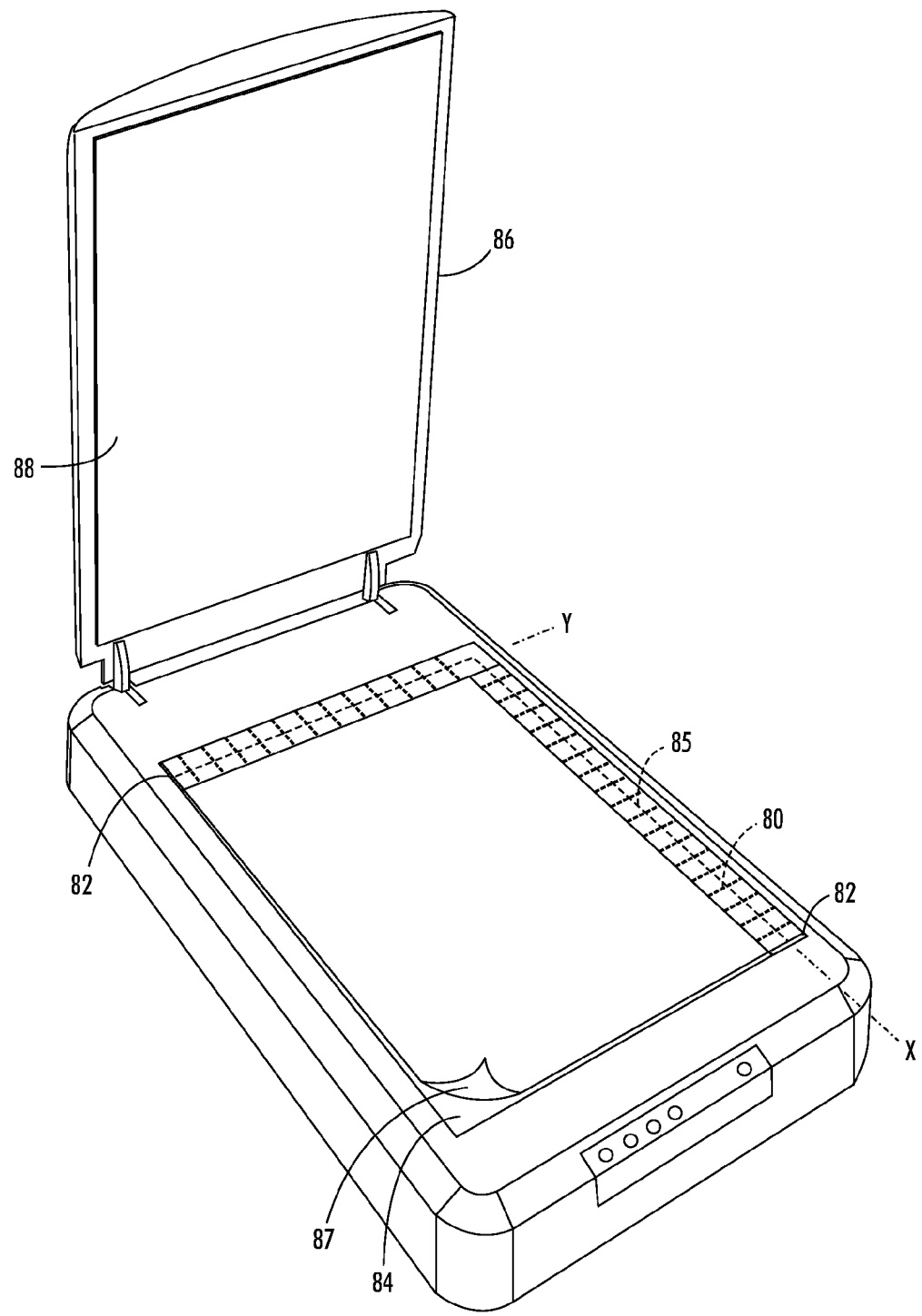
FIG. 6 is a perspective view of a scanner having edge guides including calibration marks.

In a further alternative embodiment shown in FIG. 6, calibration marks 80 may be disposed on an edge guide 82 which is removably attachable to the scanner platen 84. The edge guide 82 could be attached to the scanner in a number of ways. For example, the edge guide 82 could sit on top of the scanner as an add on frame using alignment features such as existing registration edge corners. Alternatively, the manner of securement of the edge guide 82 to the scanner may include mechanical fasteners, adhesives, or other connection means known in the art that permit the guide to be secured to the scanner and extend over the platen. The edge guide could also click into detachable fasteners. The edge guide 82 may be positioned to extend in either the X or Y axis or both. The calibration marks may be formed on the bottom surface of the edge guide 82 so that the marks sit on the platen 84. The edge guide 82 is positioned on the scanner platen 84 so that is falls within a scan area 85, thereby allowing the calibration markings to be scanned.

The edge guide 82 also ensures that at least one edge of the test sheet 87 falls within the scan area and is detected during the scan. Edge detection is important when using a flatbed scanner to measure the image on paper registration of a print because the position of at least one edge typically serves as the reference frame for image on paper measurement. Furthermore, detecting the same edge on each side of a sheet provides a common reference when measuring side 1 to side 2 image on paper registration. The scanner may include a cover 86 having an inner surface 88 including a background which contrasts with the test sheet being scanned. Since the test sheets are typically white, a black background is desirable. Therefore, when the cover 86 is closed, the white sheet is clearly contrasted against the black background, thereby making the sheet edges easily detected by the image processor. However, in order for the edge to be imaged by the scanner, the edge needs to fall within the scan area 85. The operator, therefore, has to place the test sheet such that a gap is maintained between the designated reference edges of the sheet and the outer boundary of the scan area. The edge guide 82, therefore, is positioned on the platen 84 so that the sheet edge is located within the scan area 85 and is thereby detectable.

The embodiments shown in FIGS. 5 and 6 are especially useful for calibration when the registration error is separable in the X and Y directions, which means that the registration error in the X direction is independent of the registration error in the Y direction and vice-versa. Since the calibration markings lie along the edge and outside of the domain of the test pattern marks, the image processing algorithm does not need to decipher calibration marks and test pattern marks, thereby simplifying the calibration process. In addition, since the calibration markings are only located along the edges of the scan area surrounding the test sheet to be measured, the scanner can be used for other scanning activities simply by excluding the area surrounding the print scanning area.

Figure 7:
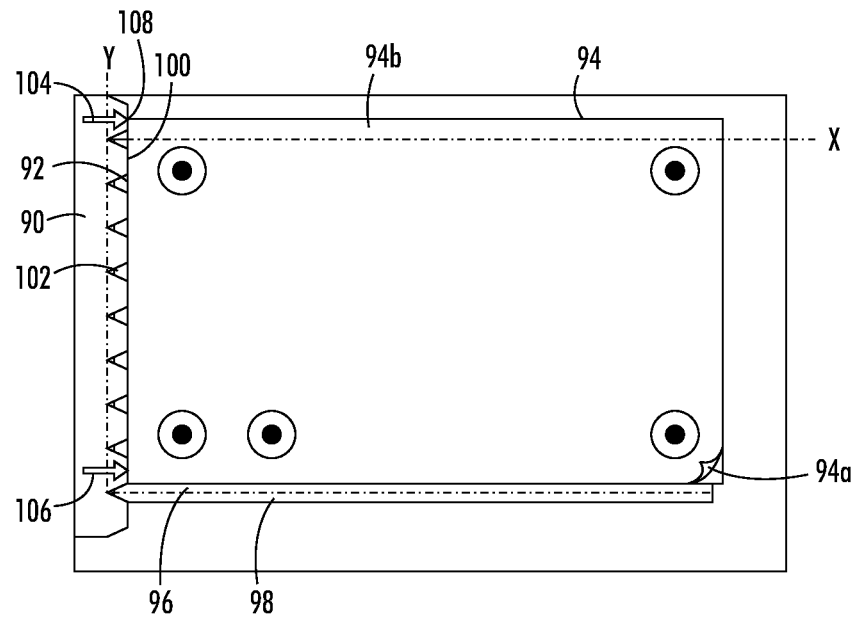
FIG. 7 is a top plan view of a scanner platen including an edge guide showing a first side of a sheet being scanned.
Figure 8:
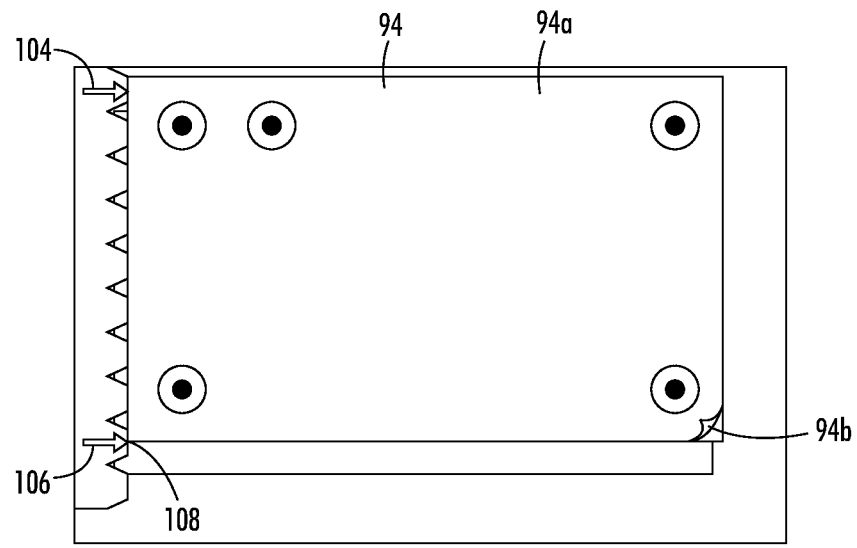
FIG. 8 is a top plan view of a scanner platen including an edge guide showing a second side of a sheet being scanned.

In still a further alternative embodiment shown in FIGS. 7 and 8, an edge guide 90 may be formed without reference marks. In this embodiment, the edge guide 90 is used to bias the edge 92 of a test sheet 94 and locate it within the scan area 96 to ensure that the edges can be detected during a scan. If scanner calibration is desired, calibration marks may be located on the platen or on the inside surface of the cover as described above. The edge guide 90 may be secured along the side of the platen 98. The manner of securement may include mechanical fasteners, adhesives, or other connection means known in the art that permit the guide to be secured to the scanner and extend over the platen. The edge guide 90 may have a longitudinally extending front edge 100 that extends into the scan area 96. The test sheet 94 having a first side 94a (FIG. 8) and a second side 94b (FIG. 7) may be placed on the platen 98 such that the sheet edge 92 abuts the front edge 100, thereby ensuring that the sheet edge 92 lies within the scan area 96. When the scanner is operated the sheet edge will be viewed by the scan bar and detected by the image processor. In order to further facilitate detection of the sheet edge 92, the front edge 100 may include a plurality of interruptions 102 such as indentations or notches. The interruptions 102 show up clearly on the scan and permit the image processor to determine precisely where the edge guide ends and where the sheet edge 92 begins. The guide permits the sheet to be properly placed along an X-axis of the platen so that the end of the sheet is detected.

It is also contemplated that the front edge may be formed without the interruptions and instead includes a smooth straight abutment surface for the test sheet. The image processer may be configured to detect the transition between the guide and the test sheet. In order to help facilitate this detection, the edge guide 90 may have a different grayscale than the test sheet or the inside of the scanner cover.

The edge guide 90 may be formed of a rigid material which is dimensionally stable. Therefore, the front edge 100 will lie at the same position within the scan area thought out use. It is also contemplated that in order to assist the imaging processing to distinguish the edge guide 90 from the test sheet 94, the edge guide 90 could be made to have with a different grayscale than the test sheet.

The edge guide 90 may further include a first reference indicia 104 to indicate to an operator where the corner of the test sheet should align for scanning the sheet first side placed against the platen as shown in FIG. 7. If the sheet is properly placed with respect to the reference mark, the sheet will be properly aligned along a Y axis. Therefore, at least two edges of the sheet will fall within the scan area and be detectable. When the test sheet includes test pattern marks on both sides, scanning of both sides is desirable. A second reference indicia 106 may be placed on the edge guide to indicate to a user where to place the corner of the test sheet when the second side is placed on the platen to be scanned as shown in FIG. 8. Accordingly, the edge guide 90 biases a printed sheet against the edge guide so that the edge falls within the scan area and also aligns a corner of the sheet with the reference indicia.

The use of a single side edge guide 90 facilitates the scanning of sheets that are larger than the scan area. When the first side of a test sheet is scanned (FIG. 7.) a reference corner 108 of the sheet may be aligned with the first reference indicia 104. When the second side is to be scanned, the same reference corner 108 of the sheet may be aligned with the second reference indicia 106 as shown in FIG. 8. In this way the same sheet corner may be used as a reference for both the first and second sides of the test sheet which facilitates registration measurement.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:
1. A method of measuring image on paper registration comprising:
 placing a test sheet of media including a plurality of test pattern marks created by a printer on a platen of an image sensing device, the platen defining a scan area over which the image sensing device is capable of scanning an image, the image sensing device including a plurality of calibration marks falling within the scan area, the test pattern marks are each disposed adjacent calibration marks when the sheet is placed on the platen;
 operating the image sensing device to scan the test sheet and the test pattern marks thereon;
 determining a scanned position of the calibration marks and a scanned position of the test pattern marks resulting from the scan, the location of the test pattern marks being determined relative to adjacent calibration marks;
 comparing the scanned position of the calibration marks with corresponding predetermined calibration marks reference positions to determine scanning error;
 determining an adjusted position of the scanned test pattern marks responsive to the scanning error to compensate for scanner error; and comparing the adjusted positions of the scanned test pattern marks with a predetermined known reference positions of the test pattern marks to measure registration accuracy of the printer.

2. The method of claim 1, wherein the calibration marks include a 2-dimensional array of markings positionally fixed on the platen and distributed over the entire scan area.

3. The method of claim 1, wherein calibration marks include a linear array of marks disposed along at least one edge of the scan area.

4. The method of claim 1, wherein the scanner includes a cover having an inside surface, the calibration marks being disposed on the inside surface of the cover.

5. The method of claim 1, wherein the scanner error is determined for each calibration mark.

6. The method of claim 1, wherein the adjusted positions of each of the test marks are determined relative to an adjacent calibration mark.

7. An image on paper registration measuring device comprising:
- a scanner having a platen for supporting a sheet having a one or more printed test pattern marks thereon, at least a portion of the platen defining a scan area;
- a plurality of calibration marks disposed within the scan area and being detectable during operation of the scanner, the test pattern marks each being disposed adjacent calibration marks when the sheet is placed on the platen and the location of the test pattern marks being determined relative to the adjacent calibration marks;
- an image processor for identifying the calibration marks and the test pattern marks on the sheet upon scanning of the sheet;
- a processor comparing scanned positions of the calibration marks with predetermined reference positions of the calibration marks to determine a scanner deviation and the processor adjusting scanned positions of the test pattern marks to compensate for the scanner deviation, the processor determining deviation between the positions of the adjusted printed test pattern marks and corresponding predetermined known reference test mark positions to determine registration accuracy, wherein the processor both calibrates the scanner and determines registration accuracy based upon imaging from a single scan.

8. The device of claim 7, wherein an edge guide is disposed on the scanner, the edge guide having an abutment edge for engaging an edge of the sheet, the abutment edge extending into the scan area.

9. The device of claim 7, wherein the calibration marks are disposed on the platen in a 2-dimensional array over the scan area.

* * * * *